Oct. 15, 1957 — R. W. TIBBETTS — 2,810,082
TRANSDUCER DAMPING
Filed Oct. 29, 1954

Inventor
Raymond W. Tibbetts
by Roberts, Cushman & Grover
Attys

United States Patent Office 2,810,082
Patented Oct. 15, 1957

2,810,082
TRANSDUCER DAMPING

Raymond W. Tibbetts, Camden, Maine, assignor to Tibbetts Laboratories, Inc., Camden, Maine, a corporation of Maine Application October 29, 1954, Serial No. 465,596

5 Claims. (Cl. 310—8.2)

This invention relates to transducers of the type comprising an electrostrictive, piezoelectric or other slab which changes dimensions between two points in response to electrical forces, for use in converting electrical energy into mechanical vibrations or vice versa, and more particularly transducers of the type disclosed in Patent 2,403,692 of George C. Tibbetts which comprise a diaphragm or other arched toggle member connected to the slab at spaced points so as to vibrate in response to the aforesaid changes of dimensions.

Objects of the invention are to provide means for damping the aforesaid vibrations which is simple and economical in construction, which can be applied easily and quickly, which does not increase the size of the device, and which is durable and reliable in use.

According to the present invention the device is provided with a thin piece of damping material together with means for connecting one part of the piece to the vibrator and means connecting another part of the piece to the slab or other non-vibrating portion of the device, the parts being offset relatively to each other edgewise of the piece so that the piece flexes back and forth when the vibrator flexes. Preferably the vibrator has an opening therein and the damping piece is connected to the non-vibrating part of the device through the opening.

In a more specific aspect the damping means comprises a bridge connected to the vibrator at spaced locations with an intermediate portion spaced from the vibrator, together with means for anchoring the intermediate portion of the bridge to the slab or other non-vibrating part of the device. Preferably the damper is in the form of a disk connected to the vibrator around its periphery with its central portion spaced from the vibrator and connected to a non-vibrating part of the device.

In still another aspect the means for connecting the damper to the non-vibrating part of the device is formed of rigid material so as to confine the damping action to the thin piece of damping material.

While the vibrator may comprise any arched toggle connected to the slab at spaced points, preferably it comprises a diaphragm which covers one side of the slab, and in the preferred embodiments a diaphragm is provided on each side of the slab.

Figure 1:
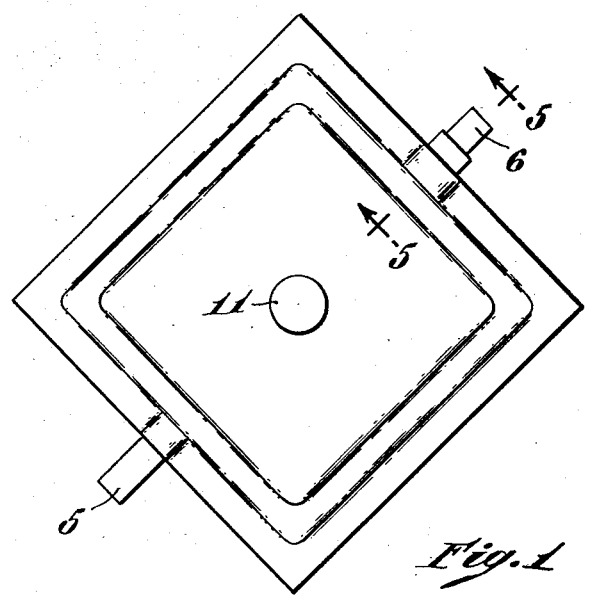
Figure 2:
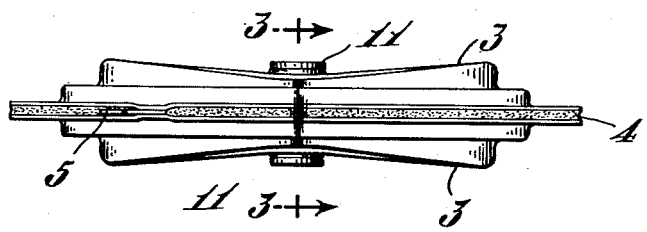
Figure 3:
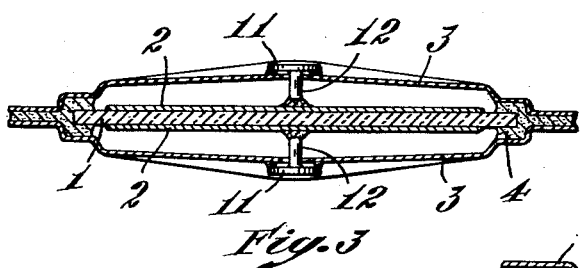
Figure 5:
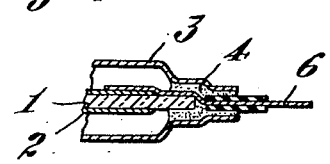
Figure 4:
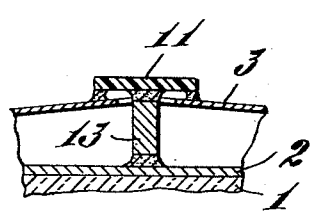

For the purpose of illustration a typical embodiment of the invention is shown in the accompanying drawings in which Fig. 1 is a plan view;
Fig. 2 is an elevation;
Fig. 3 is a section on line 3—3 of Fig. 2;
Fig. 4 is a central section of a modification; and
Fig. 5 is a section on line 5—5 of Fig. 1.

The particular embodiment of the invention chosen for the purpose of illustration comprises a square piezoelectric slab 1, electrodes 2 and diaphragms 3 which are arched toward the slab between two opposite corners as shown in Fig. 2 and which are arched away from the slab in the other diagonal direction as shown in Fig. 3, the slab being held between the diaphragm by water-resistant cement 4, and leads 5 and 6 are connected to the electrodes 2 respectively, all as disclosed in the aforesaid patent.

According to the present invention the diaphragms 3 are provided with central openings and disks 11 of damping material are cemented over the openings. In Fig. 3 the disks have integral shanks 12 extending axially through the openings in the diaphragms into juxtaposition to the electrodes 2 to which they are attached with cement, it being understood that the electrodes 2 are usually made of metal foil fast to the faces of the slab. In Fig. 4 the disks 11 are connected to the slab by means of separate posts 13 of metal, hard plastic or other rigid material cemented at their outer ends to the disks and at their inner ends to the slab.

From the foregoing it will be understood that expansion and contraction of the slab edgewise causes the diaphragms 3 to vibrate back and forth. Inasmuch as the central portions of the disks 11 are anchored to the non-vibratory slab the vibration of the diaphragms causes the disks 11 to flex back and forth intermediate their central and peripheral portions. By forming the disks of damping material such as Viscoloid produced by E. I. Dupont de Nemours & Co. or other plastic material having damping properties, each vibration of each diaphragm is quickly damped in preparation for the next signal impulse.

It should be understood that the present disclosure is for the purpose of illustration only and that this invention includes all modifications and equivalents which fall within the scope of the appended claims.

I claim:

1. A device of the character referred to comprising non-vibratory parts including a slab which changes dimensions between two points in response to electrical forces, a vibrator anchored to the slab at said points, the vibrator being arched transversely of a line joining said points so as to be flexed by said changes of dimension, a thin piece of damping material, means connecting one part of the piece to the vibrator and another part of the piece to a non-vibrating portion of the device, said parts being offset relatively to each other edgewise of the piece so that the piece flexes back and forth when the vibrator flexes.

2. A device according to claim 1 further characterized in that said piece of damping material is in the form of a bridge connected to the vibrator at spaced locations with an intermediate portion spaced from the vibrator and connected to said non-vibrating portion.

3. A device according to claim 1 further characterized in that said piece of damping material is in the form of a bridge connected to the vibrator around its periphery with its central portion spaced from the vibrator and is connected to said non-vibrating portion.

4. A device according to claim 1 further characterized in that said vibrator has an opening in it and said connecting means extends through the opening.

5. A device according to claim 1 further characterized in that said slab constitutes said non-vibratory portion.

References Cited in the file of this patent

UNITED STATES PATENTS

| | | |
|---|---|---|
| 2,237,298 | Baumzweiger | Apr. 8, 1941 |
| 2,386,279 | Tibbetts | Oct. 9, 1945 |
| 2,403,692 | Tibbetts | July 9, 1946 |